Feb. 16, 1926.

M. F. FIELD

MANDREL

Filed July 21, 1921

1,573,386

Maletie F. Field, Inventor

By F. E. Shannon

Attorney

Patented Feb. 16, 1926.

1,573,386

UNITED STATES PATENT OFFICE.

MALETIS FLOYD FIELD, OF AKRON, OHIO, ASSIGNOR TO HIMSELF AND ALPHONSO H. MARIETTA, OF AKRON, OHIO.

MANDREL.

Application filed July 21, 1921. Serial No. 486,415.

*To all whom it may concern:*

Be it known that I, MALETIS FLOYD FIELD, a citizen of the United States, residing at Akron, in the county of Summit and State of Ohio, have invented new and useful Improvements in Mandrels, of which the following is a specification.

This invention relates to certain new and useful improvements in mandrels and particularly to a mandrel adapted for use in the manufacture of tubular articles of rubber or like material, such as inner tubes for pneumatic tires.

In the ordinary method of manufacturing such tubes, a cylindrical mandrel is covered with unvulcanized rubber and the rubber covered mandrel is wrapped with fabric or placed within a retaining mold to hold the rubber close against the mandrel during vulcanization.

It is an object of the invention to provide a less expensive, more rapid method of manufacturing such tubes which when followed will provide a high grade, compact, uniform product.

It is a further object of the invention to provide a mandrel of simple, inexpensive construction which may be used without wrapping or other restraining means and to thus provide means whereby a strong, durable tube which may be constructed at a low cost.

A specific object is to provide a hollow form having an enclosed cavity with openings leading therefrom to the outer face thereof and to provide means whereby the air may be excluded therefrom and a vacuum or partial vacuum formed therein so that rubber placed thereon will be held closely to the form during vulcanization.

An additional object is to provide a new and improved tube for pneumatic tires.

The above and additional objects are accomplished by the novel construction, combination and arrangement of parts and manner of using such parts hereinafter disclosed and illustrated in the accompanying drawing, wherein I have shown a preferred embodiment of the invention, it being understood that the invention is capable of various adaptations and that changes and modifications may be made or substitutions resorted to which come within the scope of the claims hereunto appended.

In the drawings in which similar numerals of reference have been employed to designate the same or similar parts as they appear in the several views:—

Figure 1:
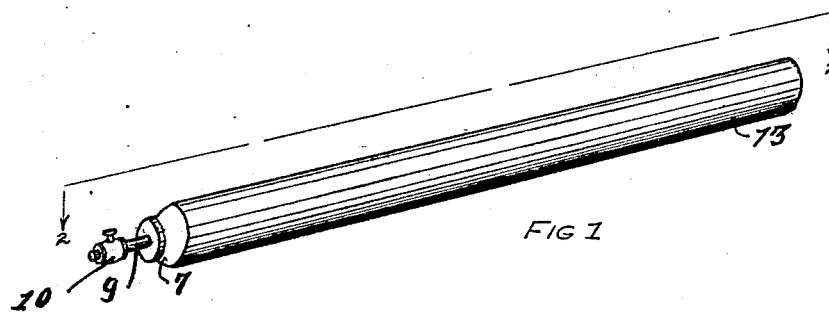
Figure 1 is a perspective view of a mandrel constructed in accordance with this invention.
Figure 2:
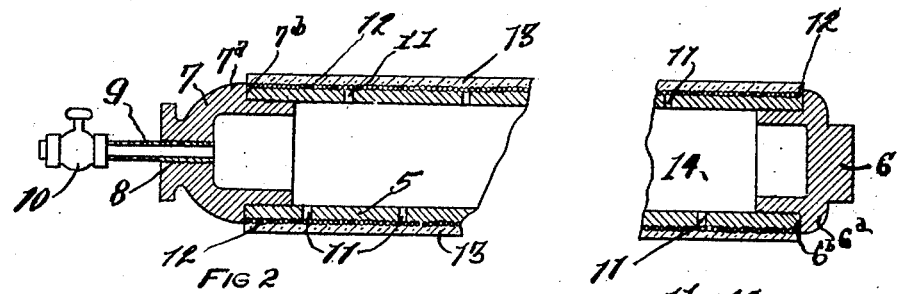
Figure 2 is a longitudinal view showing my improved mandrel in central, longitudinal section with parts removed, and also showing a covering of rubber as the same is placed thereon in the manufacture of a rubber tube.

Proceeding now to a detailed description of the invention, with reference to the accompanying drawing, the numeral 5 denotes a hollow, cylindrical member or tube preferably composed of metal or other rigid material. The tube 5 is internally threaded at each end thereof and an exteriorly threaded plug 6 is operatively secured in one end thereof. The numeral 6ª denotes an annular flange which is provided with a flat face 6ᵇ arranged thereon so as to contact with the end of the tube 5 when the plug is secured therein. The numeral 7 denotes a plug which is similar to the plug 6 and is similarly threaded in the other end of the tube 5. An annular flange 7ª is provided on the plug 7 so as to present a flat face 7ᵇ at the end of the tube 5. The plug 7 is also provided with an interiorly threaded axial bore 8 into which is threaded an outwardly projecting pipe 9. The pipe 9 is provided with a suitable valve 10 for a purpose to be hereinafter described. A plurality of bores or openings 11 are formed in the wall of the tube 5 so as to extend therethrough. The numeral 12 denotes a wire which is closely wound upon the tube 5 so as to cover the entire outer surface thereof. Each end of the wire 12 is brazed, soldered or otherwise secured to the tube 5 so that said wire becomes a permanent part thereof. The annular flanges in the plugs 6 and 7 are of substantially the same diameter as the wire wound mandrel 5 so that a form of even diameter is provided.

Figure 3:
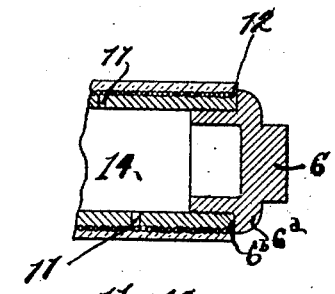
Figure 3 is a fragmentary view showing in longitudinal, central section another adaptation of my improved mandrel.
Figure 4:
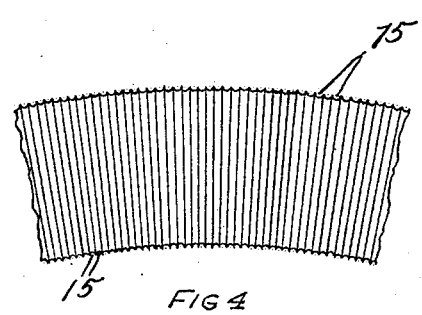
Figure 4 is a fragmentary view showing in side elevation a portion of a tube manufactured by my improved process.

In the adaptation of the invention shown in Figure 3, woven fabric 16 or other reticulated or porous material is provided instead of the wire 12.

To construct a rubber tube on my improved device, the wire-wound surface is completely covered with a sheet of unvulcanized rubber. The tube 9 is operatively connected to a pump or similar device, the valve 10 is opened and the air within the cavity 14 is pumped therefrom so as to form a vacuum or partial vacuum therein. The wire 12 being round in cross section, a space is provided between the wire covering and the mandrel. The openings 11 communicate with this space and the air is drawn from the space between the convolutions of the wire 12, thus causing a vacuum or partial vacuum to exist between the layer 13 of rubber and the tube 5. When the desired amount of air has been thus excluded from the mandrel the valve 10 is operated to close the tube 9 and the layer 13 is thus closely held about the mandrel by atmospheric pressure. The mandrel with the layer 13 thereon is then subjected to a vulcanizing heat or the layer 13 is otherwise cured. To remove the tube which is thus formed, the valve 10 is operated to open the pipe and air under pressure is forced therein. The air thus forced into the mandrel will flow between the convolutions of the wire 12 and the tube 13 will be loosened from the mandrel, whereupon it may be easily removed therefrom.

To construct an inner tube for pneumatic tires from the tubes 13, the same is turned inside out and one end is positioned with the other, and an overlapped splice is formed in the usual manner. The inner tube thus formed will be provided with a circumferentially extending series of laterally directed grooves 15 of semi-circular cross section and a serrated surface is thus provided which will prevent a longitudinal slipping of the tube in a pneumatic tire casing.

It will thus be seen that I have provided a mandrel of simple, inexpensive construction which is capable of modification to provide a form for the construction of various articles, and which when used will produce a compact, uniform product at a comparatively low cost.

Having thus described my invention in detail and illustrated one embodiment thereof, what I claim as new and desire to secure by Letters-Patent is:—

1. In a mandrel for manufacturing inner tubes, a hollow cylinder form; an opening in the wall thereof and a covering arranged thereon and forming a part thereof, said covering comprising a flexible member wound spirally around the tube.

2. In a device of the class described, a hollow elongated form, a layer of wire wound thereon, openings in the wall of said form underneath the said layer, and means whereby air may be drawn from the cavity in the form.

3. In a device of the class described, a hollow cylindrical form closed at both ends, a layer of wire wound thereon, openings in the wall of the form at points underlying said layer of wire, and a valve controlled opening leading from the interior of the form.

In testimony whereof I have hereunto set my hand.

MALETIS FLOYD FIELD.